United States Patent [19]
Doetsch et al.

[11] Patent Number: 4,681,697
[45] Date of Patent: Jul. 21, 1987

[54] PROCESS FOR PRODUCING SOLID ALUMINUM CHLORIDE COMPOSITIONS

[75] Inventors: Werner Doetsch, Bad Hoenningen; Rudolf Siegel, Neuwied, both of Fed. Rep. of Germany

[73] Assignee: Kali-Chemie Aktiengesellschaft, Hanover, Fed. Rep. of Germany

[21] Appl. No.: 854,492

[22] Filed: Apr. 22, 1986

[30] Foreign Application Priority Data

Apr. 27, 1985 [DE] Fed. Rep. of Germany ....... 3515341

[51] Int. Cl.$^4$ ............................. C02F 1/52; C02F 5/02
[52] U.S. Cl. ..................................... 252/175; 252/178; 23/305 A; 159/48.1; 210/716; 423/495; 423/556
[58] Field of Search ................ 210/716; 252/175, 178; 423/495, 556; 23/305 A; 159/48.1

[56] References Cited

U.S. PATENT DOCUMENTS

| | | | |
|---|---|---|---|
| 3,814,686 | 6/1974 | Swales | 210/716 |
| 3,929,666 | 12/1975 | Aiba | 423/556 |
| 4,098,714 | 7/1978 | Derleth | 210/716 |
| 4,131,545 | 12/1978 | Redmayne | 210/716 |
| 4,388,208 | 6/1983 | Gytel | 252/175 |
| 4,390,445 | 6/1983 | Gytel | 252/175 |
| 4,629,616 | 12/1986 | Ostertag | 423/556 |

FOREIGN PATENT DOCUMENTS

| | | | |
|---|---|---|---|
| 2263333 | 7/1974 | Fed. Rep. of Germany | 423/495 |
| 2418416 | 11/1974 | Fed. Rep. of Germany | 423/556 |
| 2449100 | 4/1975 | Fed. Rep. of Germany | 423/495 |
| 53-130297 | 11/1978 | Japan | 210/716 |
| 57-71818 | 5/1982 | Japan | 423/495 |
| 2102401 | 2/1983 | United Kingdom | 423/556 |

*Primary Examiner*—Ernest G. Therkorn
*Attorney, Agent, or Firm*—Schwartz, Jeffery, Schwaab, Mack, Blumenthal & Evans

[57] ABSTRACT

A process for producing a solid, cold-water soluble, sulfate containing aluminum chloride composition suitable for use as a waste water clarifying agent comprising introducing alkali aluminate, sulfuric acid, hydrochloric acid and hydrated aluminum oxide into a spray drier and recovering the resulting solid product.

7 Claims, No Drawings

PROCESS FOR PRODUCING SOLID ALUMINUM CHLORIDE COMPOSITIONS

BACKGROUND OF THE INVENTION

This invention relates to a process for producing solid aluminum chloride compositions.

Solutions of aluminum salts such as, for example, aluminum sulfate or basic aluminum salts, are used extensively as water treating agents for purification and treatment of waste water, ground water, etc. Among the basic aluminum salts, basic aluminum chloride salt solutions exhibit a good water clarifying effect throughout broad pH and temperature ranges.

The production of stable solutions of basic sulfate containing aluminum chloride compositions is described, for example, in West German Offenlegungschrift No. DE-OS No. 24 18 416. In this publication a whole series of prior known processes for producing solutions of basic aluminum salts are described, but all of them are very expensive or produce products with unsatisfactory characteristics. The product of the process of DE OS No. 24 18 416, itself produces satisfactory results in water treatment, but the process for its production is, however, also very expensive.

In addition, it would be desirable to produce a solid substance in order to avoid problems which arise in formulating and transporting solutions. Attempts to obtain a solid material by evaporation of the solvent from a solution which had been produced according to DE-OS No. 24 18 416, led only to a product with inferior clarifying effectiveness.

SUMMARY OF THE INVENTION

It is the object of the invention to provide a process for producing a solid aluminum chloride composition which is distinguished by good clarifying characteristics.

Another object of the invention is to provide a process for producing a solid aluminum chloride composition which can be carried out comparatively inexpensively.

A further object of the invention is to provide a process for producing a solid aluminum chloride composition which is simple to carry out and produces a product which is soluble in cold water.

These and other objects of the invention are achieved by providing a process for producing a solid aluminum chloride composition comprising the steps of introducing alkali aluminate, sulfuric acid, hydrochloric acid and hydrated aluminum oxide into a spray drier and recovering the resulting solid material.

In another aspect of the invention, a process for treating water is provided comprising adding to the water an effective clarification promoting amount of a solid, cold-water soluble, sulfate containing aluminum chloride composition produced by introducing alkali aluminate, sulfuric acid, hydrochloric acid and hydrated aluminum oxide into a spray drier.

DETAILED DESCRIPTION OF PREFERRED EMBODIMENTS

The process of the invention for producing solid, cold-water soluble, sulfate containing aluminum chloride compositions is characterized in that alkali aluminate, sulfuric acid, hydrochloric acid and hydrated aluminum oxide are introduced into a spray drier, and the resulting solid product is recovered.

It is known from German Offenlegungsschrift DE-OS No. 24 49 100 to process prepared solutions of aluminum oxychlorides by spray drying to solid products. The solutions utilized there, however, are produced by an expensive process which must be followed exactly, and there was no suggestion whatever of deviating from the process set forth in this publication and carrying out a reaction in the manner of the present invention.

The components or reactants to be utilized in the reaction are of the usual technical grade or quality. The alkali aluminate is preferably freshly prepared before the reaction by reacting an aluminum salt, for example aluminum sulfate, with an excess of alkali hydroxide. As alkali hydroxide, for example, sodium hydroxide or potassium hydroxide may be used.

Commercially available products can be utilized as the hydrated aluminum oxide. It is also possible, however, to prepare the hydrated aluminum oxide before the reaction, for example by precipitation from an aluminum salt solution with an alkali such as ammonia or maximum stoichiometric amounts of an alkali metal hydroxide.

For the conversion reaction, the reactants are introduced in an aqueous solution or an aqueous suspension into a spray drier. In a preferred embodiment the alkali aluminate and the acids may be introduced separately. The hydrated aluminum oxide may either be introduced into the spray drier as a third component via a separate supply line, or it may be introduced together with the alkali aluminate and/or the acids. In a preferred embodiment the alkali aluminate is introduced into the spray drier separately from the other components.

Conventionally constructed spray driers with atomizing nozzles or rotating atomizing or pulverizing elements can be used to carry out the process of the invention. The use of nozzles is preferred. The nozzles can be mounted in different places in the spray drier in such a way that the sprayed streams of material collide in the spray drier. In a particular embodiment a single nozzle with several concentrically arranged spray channels (multi-material nozzle) is used.

The mixing ratio of the reactants may be varied within a wide range. Processes in which the reactants are supplied in such amounts that per mole of sulfate 0.2 to 5 moles of $Al_2O_3$ and 1 to 9 moles of chloride are introduced into the spray drier have proved satisfactory. Preferably from 0.8 to 4.5 moles of $Al_2O_3$ and 4.5 to 9 moles of chloride are introduced into the spray drier per mole of sulfate.

A particularly preferred embodiment is characterized in that of the total amount of $Al_2O_3$ supplied to the spray drier, 30 to 40 percent comes from the aluminate solution and 60 to 70 percent comes from the hydrated aluminum oxide (moist hydrate) suspension.

The spray drier is operated at conventional temperatures. Off gas temperatures in the range from 90° C. to 150° C. have proved particularly satisfactory. Preferably the off gas temperature may lie in the range from about 100° C. to 135° C.

The recovery of the resulting solid material takes place in a known manner in that the stream exiting from the spray drier is introduced into an air chamber, a cyclone or other known separating device.

By following the process of the invention a solid, cold-water soluble, sulfate containing aluminum chloride composition is obtained which exhibits good storability and which can be utilized with good results in the treatment and purification of waste water. For this purpose either the solid material can be introduced as such into the water which is to be treated or an aqueous solution can first be prepared which afterward is added to the waste water. Very good results are achieved at dosages in the usual range of 0.01 to 10 ppm, particularly 0.05 to 5 ppm (mass of solids/volume of waste water).

The following example will serve to illustrate the invention in greater detail without, however, limiting its scope.

EXAMPLE 1

The following solutions were prepared for supply to a pilot scale spray drier with a two material spray nozzle (concentric spray).

Solution a1 (Acid Components)

A solution was formed from 508 g water, 47 g sulfuric acid (density=1.81 g/ml), 696 g hydrochloric acid (density=1.18 g/ml), and 161 g hydrated aluminum oxide (commercial product containing 56 wt.% $Al_2O_3$).

Solution a2 (Acid Components)

A solution was prepared as described above for solution a1 except only 254 g water were used.

Solution b (Alkali Aluminate Component)

A solution was prepared from 300 g water and 91 g sodium aluminate (commercial product containing 53 wt.% $Al_2O_3$).

The solutions a1 or a2 and b were continuously sprayed into a spray drier at the off gas temperature (°C.) and in the volume proportions given in the following table. The stream exiting from the spray drier was introduced into an air chamber from which a solid reaction product of uniform composition was continuously recovered. The recovered product could be utilized with good results in treating waste water as shown by the following tests.

| Test | Volume Ratio | | | Off Gas |
|------|----|----|-----|-------------|
| No.  | a1 | a2 | b   | Temperature |
| 1    | 51 | —  | 12  | 110–120     |
| 2    | 51 | —  | 12  | 133         |
| 3    | —  | 11 | 3.7 | 115         |
| 4    | —  | 11 | 3.7 | 131         |
| 5    | —  | 11 | 3.7 | 116         |
| 6    | —  | 11 | 3.7 | 128         |

Communal waste water was withdrawn from a waste water treatment installation behind the raking means. One-half liter portions thereof were each treated with 0.2 g of the following aluminum chloride composition.

"A" represents a solution produced in accordance with Example 1 of German Offenlegungsschrift DE-OS No. 24 18 416.

"B" represents a solution produced in accordance with Example 5 German Offenlegungsschrift DE-OS No. 24 49 100.

"C" represents the product of test no. 4 according to the present invention.

To evaluate the clarifying characteristics of the foregoing test compositions A through C, each of the compositions was added to a waste water sample, and immediately thereafter each sample was poured into a 500 ml cylinder (diameter 5 cm). After 10 minutes of standing time the height of the turbid lower phase which separated from the otherwise clear supernatant solution was measured. The following results were obtained:

| Test Composition | Lower Phase Height |
|------------------|--------------------|
| A | 7.1 cm (140 ml) |
| B | 3.8 cm (75 ml)  |
| C | 2.5 cm (50 ml)  |

Test Material C, which was produced according to the present invention, showed the best clarifying characteristics.* It is altogether surprising that by following a process which is much simpler technically, a superior product was obtained.

*Similar results were obtained with products of tests no. 1–3, 5 and 6 according to the present invention.

The foregoing description has been set forth merely to illustrate the invention and is not intended to be limiting. Since modifications of the described embodiments incorporating the spirit and substance of the invention may occur to persons skilled in the art, the scope of the invention should be limited solely with respect to the appended claims and equivalents thereof.

What is claimed is:

1. A process for producing a solid, cold-water soluble, sulfate containing aluminum chloride composition comprising the steps of introducing in aqueous solution or aqueous suspension form alkali aluminate, sulfuric acid, hydrochloric acid and hydrated aluminum oxide into a spray drier, and recovering the resulting solid material.

2. A process according to claim 1, wherein said alkali aluminate is introduced into the spray drier as a solution separately from the other ingredients.

3. A process according to claim 1, wherein per mole of sulfate 0.2 to 5 moles $Al_2O_3$ and 1 to 9 moles of chloride are introduced into the spray drier.

4. A process according to claim 3, wherein per mole of sulfate 0.8 to 4.5 moles of $Al_2O_3$ and 4.5 to 9 moles of chloride are introduced into the spray drier.

5. A process according to claim 1, wherein of the total $Al_2O_3$ introduced into the spray drier, 30 to 40 weight percent stems from the alkali aluminate solution and 60 to 70 weight percent from the hydrated aluminum oxide suspension 6. A process according to claim 1, wherein the spray drier is operated at an off gas temperature of 90° to 150° C.

7. A process according to claim 6, wherein the spray drier is operated at an off gas temperature of 100° to 135° C.

* * * * *